(12) United States Patent
Pehlke

(10) Patent No.: US 11,349,504 B2
(45) Date of Patent: May 31, 2022

(54) GANGED AND SWITCH COMBINED SYSTEMS FOR SATELLITE-NAVIGATION-BAND FILTERS

(71) Applicant: SKYWORKS SOLUTIONS, INC., Irvine, CA (US)

(72) Inventor: David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 17/086,348

(22) Filed: Oct. 31, 2020

(65) Prior Publication Data

US 2021/0135690 A1 May 6, 2021

Related U.S. Application Data

(60) Provisional application No. 62/929,617, filed on Nov. 1, 2019.

(51) Int. Cl.
| | |
|---|---|
| *H04M 1/00* | (2006.01) |
| *H04B 1/00* | (2006.01) |
| *H04B 7/08* | (2006.01) |
| *G01S 19/21* | (2010.01) |

(52) U.S. Cl.
CPC ............ *H04B 1/0057* (2013.01); *G01S 19/21* (2013.01); *H04B 1/0078* (2013.01); *H04B 7/0825* (2013.01)

(58) Field of Classification Search
CPC .. H04B 1/0057; H04B 1/0078; H04B 7/0825; G01S 19/21
USPC ........................................................ 455/552.1
See application file for complete search history.

(56) References Cited

U.S. PATENT DOCUMENTS

| | | | | |
|---|---|---|---|---|
| 2009/0115659 | A1* | 5/2009 | Watanabe | G01S 19/33 342/357.73 |
| 2013/0016633 | A1* | 1/2013 | Lum | H04L 5/001 370/277 |
| 2018/0063031 | A1* | 3/2018 | Wloczysiak | H04W 40/02 |
| 2019/0044548 | A1* | 2/2019 | Freisleben | H03H 9/725 |

* cited by examiner

*Primary Examiner* — Tanmay K Shah
(74) *Attorney, Agent, or Firm* — Chang & Hale LLP

(57) ABSTRACT

Architectures and techniques relate to ganged and switch combined systems for satellite-navigation-band filters. For example, a system can include a multiplexer configured to receive an input signal from an antenna and provide an output signal, and a combined-filter circuit coupled to the multiplexer and including a mid-range-band filter and a satellite-navigation-band filter. The combined-filter circuit can be configured to receive the output signal from the multiplexer and route the output signal to the mid-range-band filter and the satellite-navigation-band filter. The mid-range-band filter and the satellite-navigation-band filter can be implemented in at least one of a ganged configuration or a switch-combined configuration.

20 Claims, 11 Drawing Sheets

GANGED AND SWITCH COMBINED SYSTEMS FOR SATELLITE-NAVIGATION-BAND FILTERS

CROSS-REFERENCE TO RELATED APPLICATIONS

This application claims priority to U.S. Provisional Application No. 62/929,617, filed Nov. 1, 2019, and entitled "Ganged and Switch Combined Systems for Satellite-Navigation-Band Filters," the entire contents of which are incorporated herein by reference.

BACKGROUND

Field

The present disclosure relates to filter circuits.

Description of the Related Art

Wireless communication devices include many antennas, filters, switches, and amplifiers arranged in a variety of configurations to provide support for different frequency bands. For example, a wireless communication device can include a first antenna and circuitry to support a first frequency band or set of frequency bands, a second antenna and circuitry to support a second frequency band or set of frequency bands, and so on. In many cases, wireless communication devices include separate antennas and/or circuitry to support satellite-navigation bands. Such configurations occupy substantial area on wireless communication devices, such as on front-end modules or other components of the devices.

SUMMARY

In accordance with some implementations, the present disclosure relates to a system comprising a multiplexer configured to receive an input signal from an antenna and provide an output signal, and a combined-filter circuit coupled to the multiplexer and including a mid-range-band filter and a satellite-navigation-band filter. The combined-filter circuit is configured to receive the output signal from the multiplexer and route the output signal to the mid-range-band filter and the satellite-navigation-band filter. The mid-range-band filter and the satellite-navigation-band filter are implemented in at least one of a ganged configuration or a switch-combined configuration.

In some embodiments, the combined-filter circuit further includes a switch coupled to the multiplexer, the mid-range-band filter, and the satellite-navigation-band filter. The switch can include two or more arms that are configured to be controlled simultaneously to implement the switch-combined configuration. The mid-range-band filter can be a first mid-range-band filter and the combined-filter circuit further includes a second mid-range-band filter, the switch being configured to simultaneously route the output signal to the satellite-navigation-band filter and at least one of the first mid-range-band filter or the second mid-range-band filter.

In some embodiments, the mid-range-band filter is configured to support at least one of a cellular band B11, a cellular band B21, or a cellular band B32. Further, in some embodiments, the mid-range-band filter is a first mid-range-band filter configured to support a cellular band B32 for receive operations and the combined-filter circuit further includes a second mid-range-band filter configured to support at least one of a cellular band B11 for receive operations or a cellular band B21 for receive operations.

In some embodiments, the satellite-navigation-band filter is configured to support a Global Navigation Satellite System (GNSS) cellular band. The GNSS cellular band can include at least one of a GPS-L1 cellular band, a GPS-L2 cellular band, or a GPS-L5 cellular band. Further, in some embodiments, the mid-range-band filter is a first mid-range-band filter and the combined-filter circuit further includes a second mid-range-band filter. The first mid-range-band filter can be implemented in a ganged configuration with the second mid-range-band filter.

In accordance with some implementations, the present disclosure relates to a filter system comprising a first switch configured to receive a signal from a multiplexer, a first filter coupled to the first switch and associated with a satellite-navigation band within a frequency range, a second filter coupled to the first switch and associated with a first band within the frequency range, and a third filter coupled to the first switch and associated with a second band within the frequency range.

In some embodiments, the first switch includes two or more arms that are configured to be controlled simultaneously.

In some embodiments, the first filter and the second filter are coupled to the first switch via a first common input node. Further, in some embodiments, the filter system can further comprise a fourth filter coupled to the first switch and combined with the third filter. The fourth filter can be associated with the satellite-navigation band. The third filter and the fourth filter can be coupled to the first switch via a second common input node. Moreover, in some embodiments, the first switch can be configured to, in the first state, route the signal to the first filter and the second filter and configured to, in a second state, route the signal to the third filter and the fourth filter.

In some embodiments, the filter system can further comprise a second switch coupled to the second filter, the third filter, and a low noise amplifier. The second switch can be configured to select a filtered signal from the second filter or the third filter. Further, in some embodiments, the frequency range is about 960 MHz to 1710 MHz. The satellite-navigation band can be associated with a frequency range that is outside a frequency range associated with the first band and outside a frequency range associated with the second band.

In accordance with some implementations, the present disclosure relates to a radio-frequency module comprising a packaging substrate, a multiplexer implemented on the packaging substrate and coupled to at least one of a primary antenna or a diversity antenna, and a filter system implemented on the packaging substrate and coupled to the multiplexer. The filter system includes a mid-range-band filter and a satellite-navigation-band filter. The filter system is configured to receive a signal from the multiplexer and route the signal to the mid-range-band filter and the satellite-navigation-band filter. The mid-range-band filter and the satellite-navigation-band filter are implemented in at least one of a ganged configuration or a switch-combined configuration.

In some embodiments, the filter system includes a switch coupled to the multiplexer, the mid-range-band filter, and the satellite-navigation-band filter. The switch can include two or more arms that are configured to be controlled simultaneously. Further, in some embodiments, the mid-range-band filter and the satellite-navigation-band filter are combined in the ganged configuration. The mid-range-band filter and the satellite-navigation-band filter can be coupled to the switch via a common input node.

In some embodiments, the mid-range-band filter is configured to support a band within a frequency range of 960 MHz to 1710 MHz. Further, in some embodiments, the radio-frequency module is implemented as a diversity-receive module.

In accordance with some implementations, the present disclosure relates to a radio-frequency device comprising an antenna, a multiplexer coupled to the antenna and configured to receive a first signal from the antenna and sort the first signal, a filter system coupled to the multiplexer, and a controller coupled to the filter system and configured to provide a control signal to control the one or more switches of the filter system. The filter system includes a mid-range-band filter, a satellite-navigation-band filter, and one or more switches. The filter system is configured to receive a second signal from the multiplexer and route, using the one or more switches, the second signal to the mid-range-band filter and the satellite-navigation-band filter. The filter system implements the mid-range-band filter and the satellite-navigation-band filter in at least one of a ganged configuration or a switch-combined configuration.

In some embodiments, the one or more switches are implemented as a single switch. The switch includes two or more arms that are configured to be controlled simultaneously to implement the switch-combined configuration. Further, in some embodiments, the mid-range-band filter is combined with the satellite-navigation-band filter, and the mid-range-band filter and the satellite-navigation-band filter are coupled to the one or more switches via a common input node.

In some embodiments, the mid-range-band filter is configured to support a band within a frequency range is about 960 MHz to 1710 MHz. Further, in some embodiments, the radio-frequency device further comprises a low noise amplifier coupled to the filter system and configured to receive a filter signal from the filter system and to amplify the filtered signal. Moreover, in some embodiments, the antenna is implemented as a diversity antenna.

For purposes of summarizing the disclosure, certain aspects, advantages, and/or features of the disclosure have been described. It is to be understood that not necessarily all such advantages may be achieved in accordance with any particular embodiment of the disclosure. Thus, the disclosure may be embodied or carried out in a manner that achieves or optimizes one advantage or group of advantages as taught herein without necessarily achieving other advantages as may be taught or suggested herein.

BRIEF DESCRIPTION OF THE DRAWINGS

Various embodiments are depicted in the accompanying drawings for illustrative purposes and should in no way be interpreted as limiting the scope of the disclosure. In addition, various features of different disclosed embodiments can be combined to form additional embodiments, which are part of this disclosure. Throughout the drawings, reference numbers may be reused to indicate correspondence between reference elements.

DETAILED DESCRIPTION

This disclosure is directed to, in part, systems and techniques that combine filters in a ganged configuration and/or a switch-combined configuration to implement one or more satellite-navigation-band filters. For example, a system can include a first filter that is configured to support a satellite-navigation-band for receive operations and a second filter that is configured to support another band for receive operations. The system can include a common antenna, multiplexer, or other components. The first filter and the second filter can be combined in a ganged configuration and/or a switch-combined configuration, so that a signal from the antenna or multiplexer can be routed to both the first filter and the second filter (e.g., in a simultaneous manner). By combining a filter associated with a satellite-navigation-band and a filter associated with another band, and implementing such filters with a common antenna, multiplexer, and/or other components, the system can support a satellite-navigation-band in efficient manner. For example, the systems and techniques discussed herein can implement satellite-navigation-band filters on a radio-frequency module or another component that conserves area on the radio-frequency module or other component.

In some embodiments, systems and techniques are discussed herein in the context of satellite-navigation-bands and other bands that are associated with mid-range or mid-to-low-range frequencies. However, it should be understood that the systems and techniques can be applied to a wide variety of frequencies and/or frequency ranges.

Figure 1:
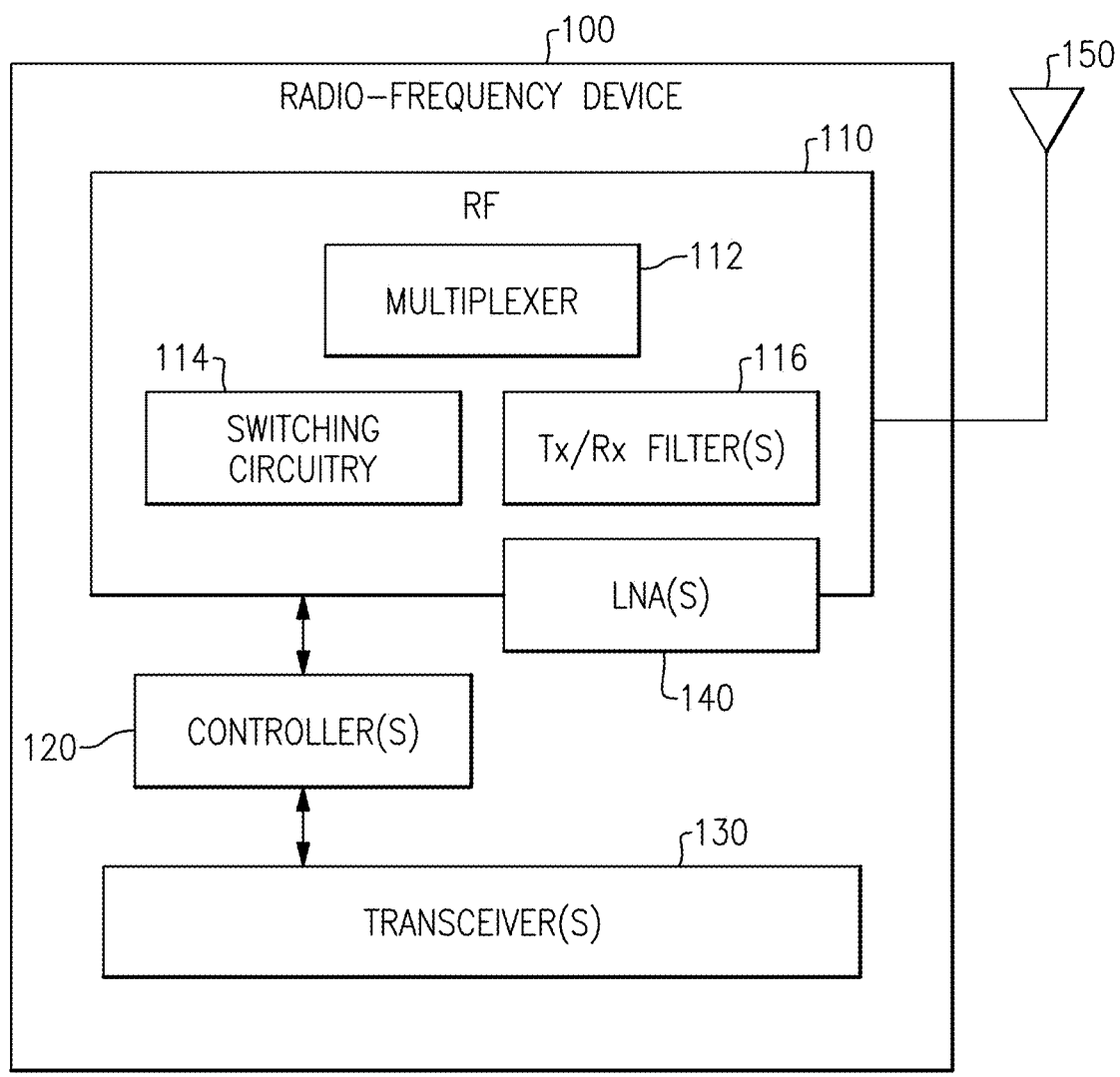
FIG. 1 illustrates an example radio-frequency device having various features relevant to certain aspects of the present disclosure.

FIG. 1 illustrates an example radio-frequency device 100 having various features relevant to certain aspects of the present disclosure. The radio-frequency device 100 includes an RF module 110, a transceiver(s) 130, a controller(s) 120, a low noise amplifier(s) (LNA(s)) 140, and an antenna(s) 150. The transceiver 130 can be configured to convert between analog signals and digital signals. The transceiver 130 can include a digital-to-analog converter, an analog-to-digital converter, a local oscillator for modulating or demodulating a baseband signal to or from a carrier frequency, a baseband processor that converts between digital samples and data bits (e.g., voice or other types of data), and/or other components. The RF module 110 can perform processing on a signal received from the antenna(s) 150 or received from the transceiver 134. In some embodiments, the RF module 110 can be referred to as a front-end module (FEM), which can be physically close to the antenna 150 (e.g., to reduce attenuation to cable loss). The controller 120 can communicate with the transceiver 130 and/or the RF module 110 to facilitate various functionality discussed herein. Although the controller 120 is illustrated as a separate component, in some embodiments the controller 120 is part of the RF module 110.

The RF module 110 can include a multiplexer(s) 112, switching circuitry 114, and/or a transmit/receive filter(s) 116 (Tx/Rx filter 116). In some embodiments, the RF module 110 includes the LNA(s) 140, while in other embodiments the LNA(s) 140 are implemented as a separate component outside the RF module 110, such as within another RF module or within another component. The multiplexer 112, the switching circuitry 114, the filter(s) 116, the LNA(s) 140, and/or other components discussed herein can be coupled to each other in a variety of manners, such as through a conductive path(s) that can include a cable, a trace, a wire, or any other conductive path/material. Although not illustrated in FIG. 1, the RF module 110 can also include other components, such as attenuators, matching circuits, duplexers, and so on.

The multiplexer 112 (also referred to as "the N-plexer 112") can be configured to implement multiplexing. The multiplexer 112 can include a diplexer, triplexer, quadplexer, or any N-plexer. In some examples of performing transmit operations, the multiplexer 112 can be configured to combine/merge a plurality of signals onto a common path or port (which can be connected to the antenna 150). Further, in some examples of performing receive operations, the multiplexer 112 can be configured to split/sort a signal from a common path or port (which can be connected to the antenna 150) into a plurality of signals. In some embodiments, each path or channel can be associated with a frequency band. The multiplexer 112 can include one or more filters, one or more switches, and/or other components. In one example implementation, the multiplexer 112 can include a low pass filter that passes frequencies associated with low-range frequency bands, a bandpass filter that passes frequencies associated with mid-range frequency bands, and a high pass filter that passes frequencies associated with high-range frequency bands. In another example implementation, the multiplexer 112 can be implemented as a diplexer that provides the functionality of a high pass filter and a low pass filter.

The filter(s) 116 can be configured to filter one or more signals. The filter(s) 116 can include multiple filters that are configured to support different frequency ranges (e.g., filter signals associated with different frequency bands). For example, the filter 116 can include one or more Tx filters that are configured to support one or more transmit frequency bands and/or one or more Rx filters that are configured to support one or more receive frequency bands. In some examples of performing transmit operations, the filter(s) 116 can receive a signal from a power amplifier (PA) or other component, filter the signal, and output the filtered signal to the multiplexer 112. Further, in some examples of performing receive operations, the filter(s) 116 can receive a signal from the multiplexer 112, filter the signal, and output the filtered signal to the LNA(s) 140. In some embodiments, the filter(s) 116 includes one or more filters configured to support one more low-range bands (LB), one or more mid-to-low-range bands (MLB), one or more mid-to-high-range bands (MHB), one or more high-range bands (HB), one or ultra-high-range bands (UHB), and so on. Further, in some embodiments, the filter(s) 116 includes one or more filters configured to support one or more satellite-navigation bands, such as one or more Global Navigation Satellite System (GNSS) cellular bands. In some embodiments, multiple filters 116 can be implemented in a ganged configuration and/or a switch combined configuration, as discussed in further detail below.

The switching circuitry 114 can include one or more switches or other circuitry configured to selectively route one or more signals between components of the RF module 110. A switch can include a transistor(s), a mechanical switch(s), or any other switch, and/or can include any number of throws/poles. In some embodiments, the switching circuitry 114 can include a switch (e.g., a band select switch) that is configured to receive a signal from the multiplexer 112 and selectively route the signal to a particular one of filters 116 that is associated with a particular frequency band. In some embodiments, the switching circuitry 114 includes a multi-arm-controlled switch that is configured to enable/disable multiple paths simultaneously, as discussed in further detail below. Additionally, or alternatively, in some embodiments, the switching circuitry 114 can include one or more switches that are configured to receive one or more signals from the filters 116 and selectively route a signal to one or more of LNAs 140.

The controller 120 can be configured to generate and/or send control signals to components of the radio-frequency device 100. For example, the controller 120 can send a control signal to the multiplexer 112 to control sorting or combining of signals, send a control signal to the switching circuitry 114 to route a signal (e.g., turn on or off a switch), send a control signal to the filter(s) 116 to enable/disable a filter, and so on. In some embodiments, the radio-frequency device 100 is configured to implement a plurality of gain modes for different amounts of amplification, and the controller 120 is configured to send a control signal to the RF module 110, the LNA(s) 140, and/or a PA to control a gain mode. Each gain mode can be associated with a different amount of amplification. For example, the controller 120 can provide a control signal indicative of a desired or targeted gain. In some embodiments, the controller 120 can include control circuitry configured to implement one or more of the operations discussed herein.

The antenna 150 can include one or more primary antennas and/or one or more diversity antennas. A primary antenna and a diversity antenna can be physically spaced apart such that a signal at the primary antenna and the diversity antenna are received with different characteristics. For example, a primary antenna and a diversity antenna can receive the signal with different attenuation, noise, frequency response, and/or phase shift. The transceiver 130 can use both of the signals with different characteristics to determine data bits corresponding to the signal. In some implementations, the transceiver 130 selects between a primary antenna and a diversity antenna based on the characteristics, such as selecting the antenna with the highest signal-to-noise ratio. In some embodiments, the transceiver 130 combines signals from a primary antenna and a diversity antenna to increase the signal-to-noise ratio of the combined signal. In some embodiments, the transceiver 130 processes signals to perform multiple-input/multiple-output (MIMO) communication. As noted above, in some embodiments, the diversity antenna can be physically spaced apart from the primary antenna. Here, the diversity antenna can be coupled to the transceiver 130 by a transmission line, such as a cable, a printed circuit board (PCB) trace, or another component. In examples, the transmission line is lossy and/or attenuates the signal received at the diversity antenna before it reaches the transceiver 130.

In some embodiments, the radio-frequency device 100 can implement a single antenna and/or a single antenna for each RF module. For example, the RF module 110 can be coupled to a single antenna and be configured to support one or more satellite-navigation bands as well as one or more other bands in a combined manner. Here, the radio-frequency device 100 can implement a common antenna to support the one or more satellite-navigation bands and the one or more other bands. By implementing a common antenna with a RF module that is configured to implement many frequency bands, including one or more satellite-navigation bands, the radio-frequency device 100 can utilize resources in an efficient manner, in comparison to other solutions that implement a separate antenna and/or RF module for satellite-navigation bands.

Further, in some embodiments, the radio-frequency device 100 can implement multiple RF modules and/or multiple antennas. In one example, the radio-frequency device 100 can include a first RF module that is coupled to a first antenna and that is configured to support one or more first satellite-navigation bands (e.g., Global Positioning System (GPS) band L1) and one or more first other bands (e.g., a first set of mid-range frequency bands). Here, the radio-frequency device 100 can also include a second RF module that is coupled to a second antenna and that is configured to support one or more second satellite-navigation bands (e.g., GPS-L5) and one or more second other bands (e.g., the first set of mid-range frequency bands or a second set of mid-range frequency bands). In another example, the radio-frequency device 100 implements multiple RF modules that are the same. For example, the radio-frequency device 100 can include a first RF module that supports one or more frequency bands and a second RF module that supports the same one or more frequency bands. In some cases, the first RF module can be located at a different location on the radio-frequency device 100 than the second RF module. Such diversity in location can allow the radio-frequency device 100 to switch between modules and/or antennas to achieve a desired performance characteristic (sometimes referred to as "antenna swapping").

Figure 2:
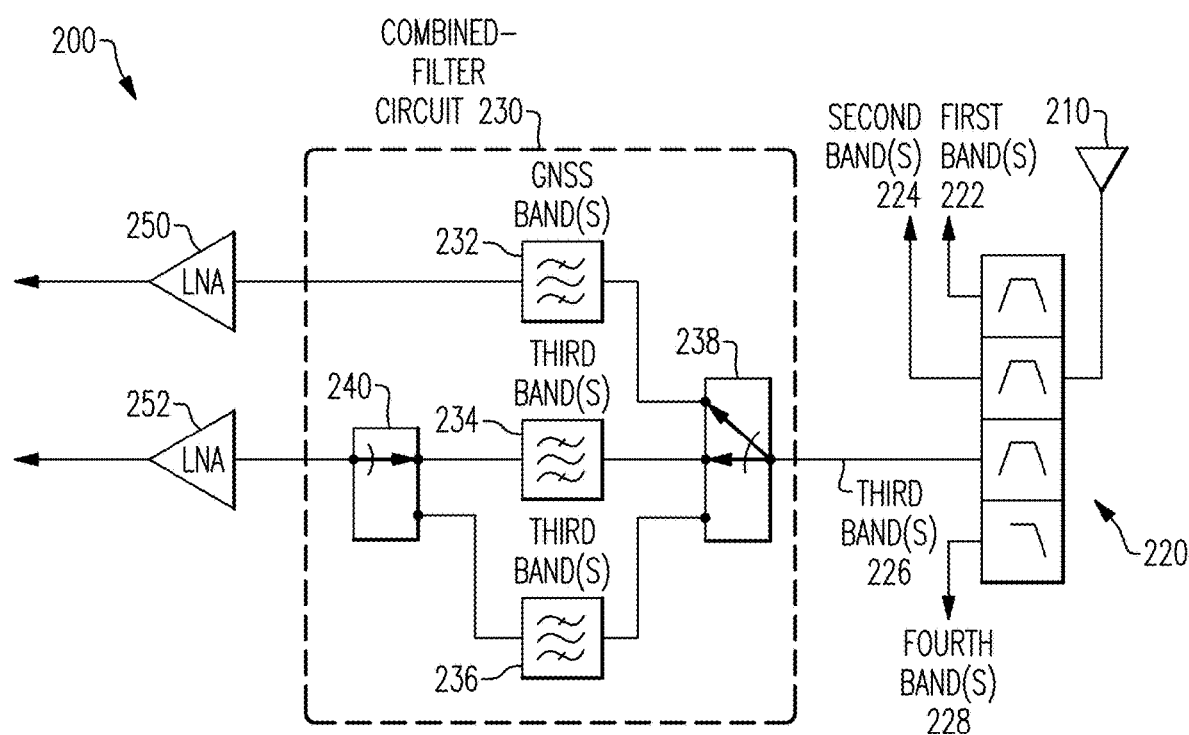
FIG. 2 illustrates an example system that includes a satellite-navigation-band filter and one or more other band filters implemented in a switch-combined configuration in accordance with one or more embodiments.

FIG. 2 illustrates an example system 200 that includes a satellite-navigation-band filter and one or more other band filters implemented in a switch-combined configuration in accordance with one or more embodiments. The example system 200 is discussed in the context of receiving one or more signals (e.g., the system 200 is implemented to perform one or more receive operations). However, the system 200 can be implemented in the context of transmitting one or more signals (e.g., the system 200 can be implemented to perform one or more transmit operations). In some embodiments, at least a portion of the system 200 is implemented within a radio-frequency module. Although the system 200 can be implemented within a variety of components and/or devices.

The system 200 includes an antenna 210 coupled to a multiplexer 220. The antenna 210 can include a primary antenna, a diversity antenna, or any other antenna. The antenna 210 can be configured to receive a signal and/or provide the signal to the multiplexer 220. The multiplexer 220 can be configured to receive the signal from the antenna 210 and sort the signal into a plurality of signals that are associated with a plurality of frequency ranges, respectively. For example, the multiplexer 220 can include: (i) a first filter (e.g., a band-pass or high-pass filter) that is configured to provide an output signal associated with one or more first frequency bands 222 that are within a first frequency range or above a threshold frequency (e.g., a relatively high frequency range or above a threshold); (ii) a second filter (e.g., a band-pass filter) that is configured to provide an output signal associated with one or more second frequency bands 224 that are within a second frequency range (e.g., a mid-to-high frequency range); (iii) a third filter (e.g., a band-pass filter) that is configured to provide an output signal associated with one or more third frequency bands 226 that are within a third frequency range (e.g., a mid-to-low frequency range); and/or (iv) a fourth filter (e.g., a low-pass filter or band-pass filter) that is configured to provide an output signal associated with one or more fourth frequency bands 228 that are within a fourth frequency range (e.g., a low frequency range). Although four filters are illustrated in FIG. 2, the multiplexer 220 can include any number of filters. In some embodiments, the signal paths for the one or more first frequency bands 222, the one or more second frequency bands 224, and/or the one or more fourth frequency bands 228 are coupled to other circuitry/systems so that the associated signals can be filtered and/or processed.

The system 200 also includes a combined-filter circuit 230 coupled to the multiplexer 220. In this example, the combined-filter circuit 230 includes a switch 238 coupled to the multiplexer 220, one or more Global Navigation Satellite System (GNSS) filters 232 coupled to the switch 238 and a low noise amplifier (LNA) 250, one or more third band filters 234 coupled to the switch 238 and a switch 240, one or more third band filters 236 coupled to the switch 238 and the switch 240, and the switch 240 coupled to the one or more third band filters 234, the one or more third band filters 236, and an LNA 252. The combined-filter circuit 232 can be configured to receive a signal associated with the one or more third bands 226 from the multiplexer 220, such as a mid-range signal of around 1.5 GHz or another signal. The switch 238 can be controlled to route the signal to the one or more GNSS filters 232, the one or more third band filters 234, and/or the one or more third band filters 236. The switch 240 can be controlled to route a signal from the one or more third band filters 234 to the LNA 252 or to route a signal from the one or more third band filters 236 to the LNA 252. For example, if the switch 238 routes a signal to the one or more third band filters 234, the switch 240 can select the one or more third band filters 234. In contrast, if the switch 238 routes a signal to the one or more third band filters 236, the switch 240 can select the one or more third band filters 236. In some embodiments, the switch 238 and/or the switch 240 are configured to be controlled based on a control signal, such as a signal that is sent by a controller.

In the example of FIG. 2, the switch 238 is implemented as a multi-arm-controlled switch that includes two or more arms that are configured to be simultaneously controlled, such as with the same control signal. In some embodiments, the multi-arm-controlled switch 238 is configured to route a signal to (i) the one or more GNSS filters 232 and (ii) one of the one or more third band filters 234 or the one or more third band filters 236. However, the multi-arm-controlled switch 238 can be configured to route a signal to any combination of the one or more GNSS filters 232, the one or more third band filters 234, and the one or more third band filters 236. Further, although the switch 240 is discussed in the context of selecting either the one or more third band filters 234 or the one or more third band filters 236, in some embodiments the switch 240 can select both of the one or more third band filters 234 and the one or more third band filters 236. Further, the switch 240 can be eliminated in some embodiments. Although the switches 238 and 240 are illustrated as part of the combined-filter circuit 230, in some embodiments the switches 238 and/or 240 are part of a different circuit.

The one or more GNSS filters 232 can each be configured to support a satellite-navigation band. A satellite-navigation band can be associated with a wide variety of satellite-based positioning systems, such as the global positioning system (GPS), the Globalnaya Navigazionnaya Sputnikovaya Sistema (GLONASS) system, the Galileo system, the BeiDou system (also known as the COMPASS system), or any other satellite-based positioning system. A satellite-based positioning system can provide and/or be used to determine a geographic location of a device. In some embodiments, the one or more GNSS filters 232 are implemented as a single GNSS filter, while in other embodiments the one or more GNSS filters 232 are implemented as multiple GNSS filters (which can be combined/ganged together). As one example implementation, the one or more GNSS filters 232 can be configured to filter a GNSS signal of around 1,575 MHz. Non-limiting example satellite-navigation bands and approximate frequency ranges for such bands are shown below in Table 1. Although various satellite-navigation bands are shown, a satellite-navigation band can include other bands not illustrated. Further, other frequency ranges than those shown below can be used for the satellite-navigation bands.

TABLE 1

| Band | Frequency Range (MHz) |
|---|---|
| GPS-L1 | 1,559-1,607 |
| GPS-L2 | 1,215-1,239 |
| GPS-L5 | 1,164-1,189 |
| Galileo E1 | 1,559-1,591 |
| Galileo E5 | 1,164-1,214 |
| Galileo E6 | 1,260-1,300 |
| GLONASS G1 | 1,593-1,610 |
| GLONASS G2 | 1,237-1,254 |
| GLONASS G3 | 1,189-1,214 |
| BeiDou B1 | 1,559-1,591 |
| BeiDou B2 | 1,164-1,214 |
| BeiDou B3 | 1,260-1,279 |

The one or more third band filters 234 and/or the one or more third band filters 236 can be configured to support a variety of frequency bands. The one or more third band filters 234 and the one or more third band filters 236 can generally support different frequency bands. For example, the one or more third band filters 234 can support a first frequency band, while the one or more third band filters 236 can support a second frequency band. However, in some embodiments, the one or more third band filters 234 and the one or more third band filters 236 can support at least some of the same frequency bands. For example, the one or more third band filters 234 can support a first frequency band and a second frequency band (which can be implemented in a combined/ganged configuration), while the one or more third band filters 236 can support the second frequency band and a third frequency band (which can be implemented in a combined/ganged configuration). In some embodiments, the one or more third band filters 234 and the one or more third band filters 236 are implemented along separate paths (as illustrated in FIG. 2) to support overlapping frequency bands. For example, the one or more third band filters 234 can support a first set of one or more frequency bands, while the one or more third band filters 236 can support a second set of one or more frequency bands that at least partly overlap with the first set of one or more frequency bands. Non-limiting example bands and approximate frequency ranges that can be implemented for the one or more third band filters 234 and/or the one or more third band filters 236 bands are shown below in Table 2. Although various bands are shown, the one or more third band filters 234 and/or the one or more third band filters 236 can include other bands not illustrated. Further, other frequency ranges than those shown below can be used for the one or more third band filters 234 and/or the one or more third band filters 236.

TABLE 2

| Band | Mode | Tx Frequency Range (MHz) | Rx Frequency Range (MHz) |
|---|---|---|---|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B32 | SDL | | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |

In some embodiments, the one or more GNSS filters 232, the one or more third band filters 234, and/or the one or more third band filters 236 are associated with a specific frequency range. For example, the one or more GNSS filters 232, the one or more third band filters 234, and the one or more third band filters 236 can include band filters that are configured to support mid-to-low-range frequency bands (MLB) (e.g., a frequency range of about 960 MHz to 1710

MHz). However, the one or more GNSS filters 232, the one or more third band filters 234, and/or the one or more third band filters 236 can support a variety of frequency ranges, such as mid-to-high-range bands (MHB), low-range bands (LB), high-range bands (HB), mid-range bands (which can include the MLBs and MHBs), or any combination thereof. In some embodiments, the one or more GNSS filters 232 are associated with a frequency range of 1,559-1607 MHz (e.g., the upper L bands). In some embodiments, the one or more GNSS filters 232 are associated with a frequency band(s) (e.g., a frequency range) that is outside a frequency band associated with the one or more third band filters 234 and/or the one or more third band filters 236.

The LNA 250 and/or the LNA 252 can be configured to amplify a signal and provide the amplified signal to another component, such as a transceiver (not illustrated). In the example of FIG. 2, the LNA 252 is coupled to and configured to receive a signal from the switch 240, while the LNA 250 is coupled to and configured to receive a signal from the one or more GNSS filters 232. However, the LNAs can be arranged in a variety of other configurations. Further, although two LNAs are illustrated, any number of LNAs can be implemented. For example, the system 200 can include an LNA for each of the three branches (e.g., three LNAs for the three filters 232, 234, and 236), a single LNA for all three of the branches, and so on.

Figure 3:
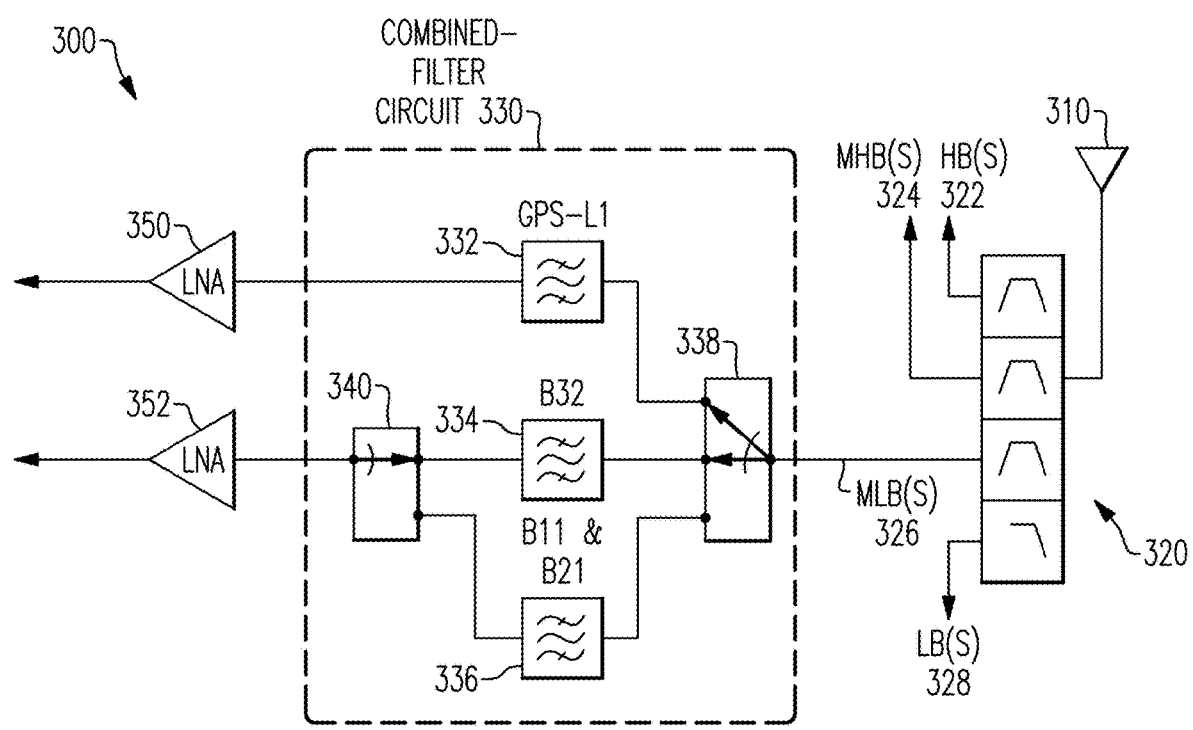
FIG. 3 illustrates an example system that includes a satellite-navigation-band filter and multiple mid-range filters implemented in a switch-combined configuration in accordance with one or more embodiments.

FIG. 3 illustrates an example system 300 that includes a satellite-navigation-band filter and multiple mid-range filters implemented in a switch-combined configuration in accordance with one or more embodiments. In some embodiments, the system 300 illustrates an example of the system 200 of FIG. 2 with the one or more GNSS filters 232 implemented as a global positioning system (GPS) L1 band filter 332, the one or more third band filters 234 implemented as a B32 band filter 334, the one or more third band filters 236 implemented as B11 and B21 band filters 336, the one or more first bands 222 implemented as one or more high-range bands 322 (or ultra-high-range bands), the one or more second bands 224 implemented as one or more mid-to-high-range bands 324, the one or more third bands 226 implemented as one or more mid-to-low-range bands 326, and the one or more fourth bands 228 implemented as one or more low-range bands 328. However, the system 300 can be implemented in a variety of other contexts.

The system 300 includes an antenna 310 coupled to a multiplexer 320. The multiplexer 320 can be configured to sort a signal into a plurality of signals that are associated with a plurality of frequency ranges, respectively. For example, the multiplexer 320 can include: (i) a first filter (e.g., a band-pass or high-pass filter) that is configured to provide an output signal associated with the one or more high-range bands (HB) 322; (ii) a second filter (e.g., a band-pass filter) that is configured to provide an output signal associated with the one or more mid-to-high-range bands (MHB) 324; (iii) a third filter (e.g., a band-pass filter) that is configured to provide an output signal associated with the one or more mid-to-low-range bands (MLB) 326; and/or (iv) a fourth filter (e.g., a low-pass filter) that is configured to provide an output signal associated with the one or more low-range bands (LB) 328. Although four filters are illustrated in FIG. 3, the multiplexer 320 can include any number of filters. Some non-limiting examples that can be implemented for the one or more HBs 322, the one or more MHBs 324, the one or more MLBs 326, and the one or more LB 328 are shown below in Table 3. However, it should be understood that the frequency bands can be implemented with different frequency ranges (e.g., Table 3 below provides but some of many example frequency ranges for the various frequency bands).

TABLE 3

| Band | Frequency Range (MHz) |
| --- | --- |
| Low-Range Bands (LBs) | 617-960 |
| Mid-to-Low-Range Bands (MLBs) | 960-1,710 |
| Mid-to-High-Range Bands (MHBs) | 1,710-2,200; 1,710-2,690 |
| High-Range Bands (HBs) | 2,200-above; 2,690-above |

The system 300 also includes a combined-filter circuit 330 coupled to the multiplexer 320. In this example, the combined-filter circuit 330 includes a switch 338 coupled to the multiplexer 320, the GPS-L1 band filter 332 coupled to the switch 338 and a low noise amplifier (LNA) 350, the B32 band filter 334 coupled to the switch 338, the B11 and B21 band filters 336 coupled to the switch 338, and a switch 340 coupled to the B32 band filter 334, the B11 and B21 band filters 336, and an LNA 352. The combined-filter circuit 332 can be configured to receive a signal from the multiplexer 320. The switch 338 can be controlled to route the signal to the GPS-L1 band filter 332, the B32 band filter 334, and/or the B11 and B21 band filters 336. The switch 340 can be controlled to route a signal from the B32 band filter 334 to the LNA 352 or to route a signal from the B11 and B21 band filters 336 to the LNA 352. The GPS-L1 band filter 332 can be configured to support a GPS-L1 band (e.g., configured to filter a signal for the GPS-L1 cellular band), the B32 band filter 334 can be configured to support a B32 cellular band (e.g., configured to filter a signal for the B32 cellular band), and the B11 and B21 band filters 336 can be configured to support the B11 and B21 cellular bands (e.g., configured to filter signals for the B11 and B21 cellular bands). The B11 and B21 band filters 336 can be implemented as a combined filter (e.g., in a ganged configuration), since the B11 and B21 bands do not overlap. In the example of FIG. 3, the switch 338 is implemented as a multi-arm-controlled switch so that the filters 332, 334, and/or 336 are implemented in a switch-combined configuration. However, the switch 338 can be implemented in other manners. Further, in the example of FIG. 3, the B32 band filter 334 and the B11 and B21 band filters 336 are implemented along separated paths (e.g., the switch 338 selects one of the two paths) to isolate the filters 334 and 336 from each other, since the frequency ranges of the filters 334 and 336 overlap.

In some embodiments, the techniques and architectures discussed herein combine filters in a flexible way to enable carrier aggregation combinations with certain bands, such as MLBs, and/or to support simultaneous 4×4 down link (DL) MIMO in the MBs and HBs involved in these combinations. Further, in some embodiments, an implementation of a multiplexer (also referred to as an N-plexer) with a shared antenna can provide better isolation and/or lower insertion loss, in comparison to other solutions.

Figure 4:
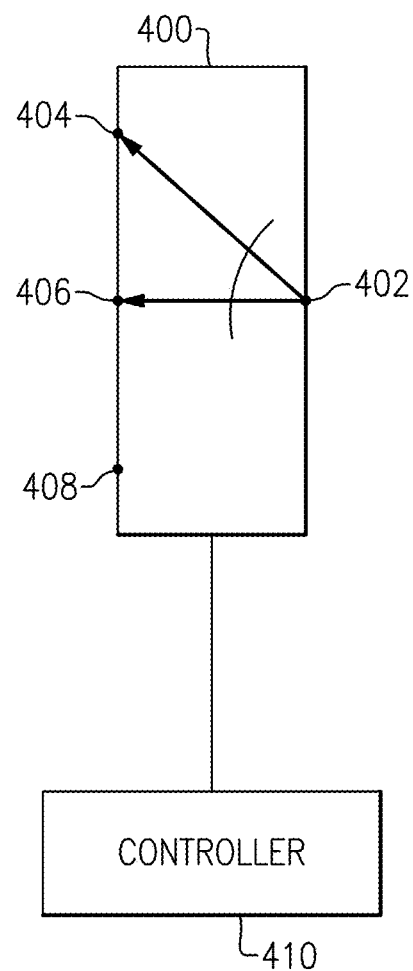
FIG. 4 illustrates an example multi-arm-controlled switch in accordance with one or more embodiments.

FIG. 4 illustrates an example multi-arm-controlled switch 400 in accordance with one or more embodiments. The multi-arm-controlled switch 400 can be configured to be implemented with multiple filters/components to arrange the filters/components in a switch-combined configuration (also referred to as a "flexibly switch-combined architecture"). The multi-arm-controlled switch 400 includes an input node 402 (also referred to as a "pole") and multiple output nodes 404, 406, and 408 (also referred to as "throws"). The multi-arm-controlled switch 400 includes multiple arms, wherein two or more of the arms are configured to be simultaneously controlled, such as based on a control signal sent from a controller 410. For example, the controller 410 can provide a control signal (e.g., a single control signal) to the multi-arm-controlled switch 400 to join the output node 404 and the output node 406 to the input node 402. In response to receiving the control signal, the multi-arm-controlled switch 400 can engage two arms of the multi-arm-controlled switch 400 (e.g., turn two arms to an ON state) to connect/conjoin the output node 404 and the output node 406 to the input node 402, as illustrated in the example of FIG. 4. As such, the multi-arm-controlled switch 400 is a flexibly configured switch that is able to simultaneously engage two or more arms to connect/join various combinations of components (e.g., filters) that can be connected to the output nodes 404, 406, and 408. In other words, the multi-arm-controlled switch 400 can simultaneously join components to a common RF path, which can provide different carrier aggregation (CA) pairings.

In some embodiments, the multi-arm-controlled switch 400 is implemented with one or more transistors. A transistor can be implemented as a single device or multiple devices. A transistor can include a field-effect transistor (FET) (e.g., N-type or P-type device), such as a junction FET (JFET), insulated gate FET (e.g., a metal-oxide-semiconductor FET (MOSFET), a complementary metal-oxide-semiconductor (CMOS), etc.), and so on. Further, a transistor can include a Bipolar junction transistor (BJT) (e.g., an NPN transistor, a PNP transistor, etc.), such as a heterojunction bipolar transistors (HBT), etc. Alternatively, or additionally, in some embodiments, the multi-arm-controlled switch 400 is implemented with one or more mechanical switches or other types of switches.

Figure 5:
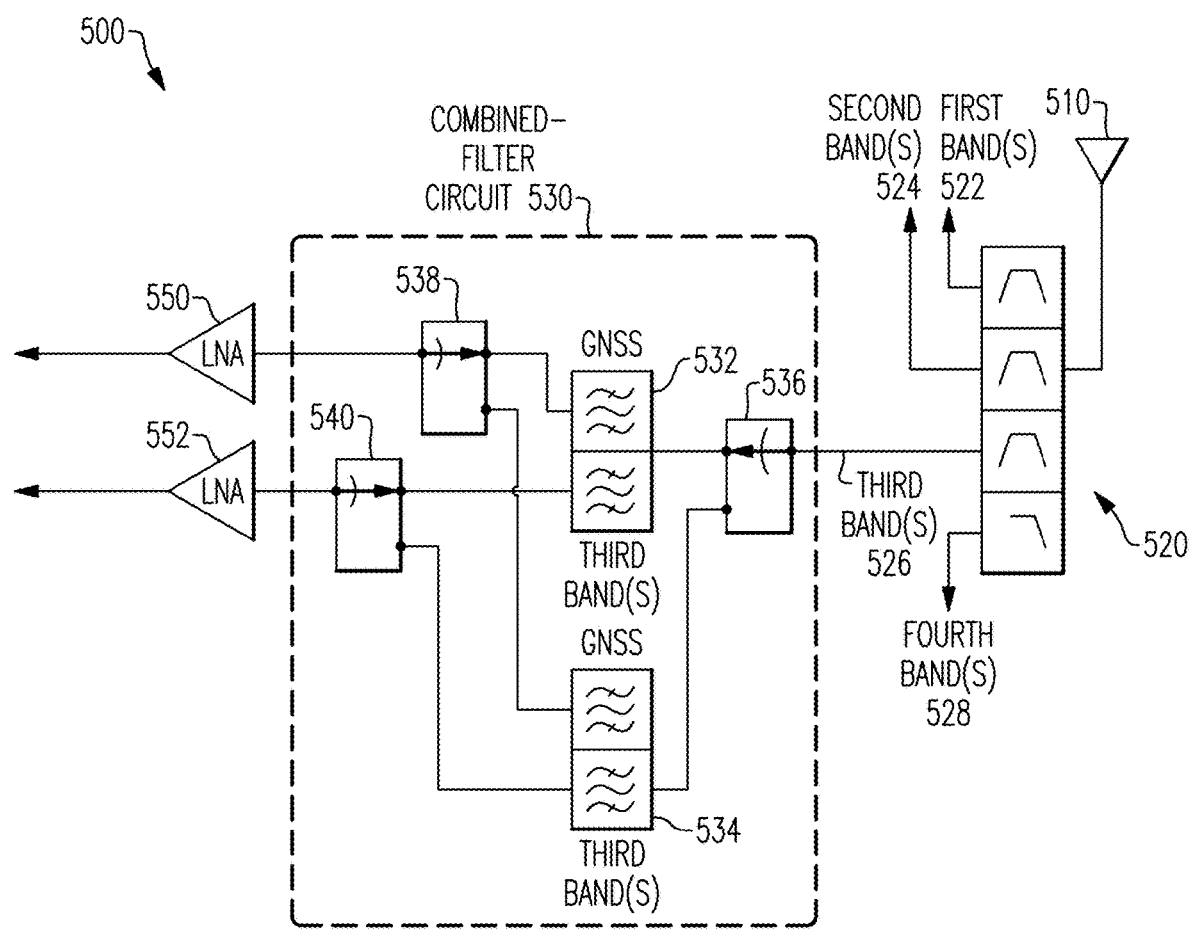
FIG. 5 illustrates an example system that includes a satellite-navigation-band filter and one or more other band filters implemented in a ganged configuration in accordance with one or more embodiments.

FIG. 5 illustrates an example system 500 that includes a satellite-navigation-band filter and one or more other band filters implemented in a ganged configuration in accordance with one or more embodiments. The example system 500 is discussed in the context of receiving one or more signals (e.g., the system 500 is implemented to perform one or more receive operations). However, the system 500 can be implemented in the context of transmitting one or more signals (e.g., the system 500 can be implemented to perform one or more transmit operations). In some embodiments, at least a portion of the system 500 is implemented within a radio-frequency module. Although the system 500 can be implemented within a variety of components and/or devices.

The system 500 includes an antenna 510 coupled to a multiplexer 520. The antenna 510 can include a primary antenna, a diversity antenna, or any other antenna. The antenna 510 can be configured to receive a signal and/or provide the signal to the multiplexer 520. The multiplexer 520 can be configured to receive the signal from the antenna 510 and sort the signal into a plurality of signals that are associated with a plurality of frequency ranges, respectively. For example, the multiplexer 520 can include: (i) a first filter (e.g., a band-pass or high-pass filter) that is configured to provide an output signal associated with one or more first frequency bands 522 that are within a first frequency range or above a threshold frequency (e.g., a relatively high frequency range or above a threshold designated as high); (ii) a second filter (e.g., a band-pass filter) that is configured to provide an output signal associated with one or more second frequency bands 524 that are within a second frequency range (e.g., a mid-to-high frequency range); (iii) a third filter (e.g., a band-pass filter) that is configured to provide an output signal associated with one or more third frequency bands 526 that are within a third frequency range (e.g., a mid-to-low frequency range); and/or (iv) a fourth filter (e.g., a low-pass filter or band-pass filter) that is configured to provide an output signal associated with one or more fourth frequency bands 528 that are within a fourth frequency range (e.g., a low frequency range). Although four filters are illustrated in FIG. 5, the multiplexer 520 can include any number of filters. In some embodiments, the signal paths for the one or more first frequency bands 522, the one or more second frequency bands 524, and/or the one or more fourth frequency bands 528 are coupled to other circuitry so that the associated signals can be filtered and/or processed.

The system 500 also includes a combined-filter circuit 530 coupled to the multiplexer 520. In this example, the combined-filter circuit 530 includes a switch 536 coupled to the multiplexer 520, ganged filters 532 coupled to the switch 536, ganged filters 534 coupled to the switch 536, a switch 538 coupled to the ganged filters 532, the ganged filters 534, and a low noise amplifier (LNA) 550, and a switch 540 coupled to the ganged filters 532, the ganged filters 534, and an LNA 552. The combined-filter circuit 532 can be configured to receive a signal associated with the one or more third bands 526 from the multiplexer 520. The switch 536 can be controlled to route the signal to the ganged filters 532 and/or the ganged filters 534. The switch 538 can be controlled to route a signal from either the ganged filters 532 or the ganged filters 532 to the LNA 550. Further, the switch 540 can be controlled to route a signal from either the ganged filters 532 or the ganged filters 534 to the LNA 552.

As shown, the ganged filters 532 include a Global Navigation Satellite System (GNSS) filter and one or more third band filters combined in a ganged configuration. Similarly, the ganged filters 534 include a GNSS filter and one or more third band filters in a ganged configuration. In a ganged configuration, filters can share a common input node, as discussed in further detail below in reference to FIG. 7. The GNSS filter of the ganged filters 532 and/or the GNSS filter of the ganged filters 534 can be configured to support a satellite-navigation band. In some embodiments, the GNSS filter of the ganged filters 532 is the same as the GNSS filter of the ganged filters 534 (e.g., the filters support the same frequency band(s)), while in other embodiments the GNSS filter of the ganged filters 532 is different than the GNSS filter of the ganged filters 534 (e.g., the filters support different frequency bands). Further, in some embodiments, the one or more third band filters of the ganged filters 532 are different than the one or more third band filters of the ganged filters 534 (e.g., the filters support different frequency bands), while in other embodiments the one or more third band filters of the ganged filters 532 are the same as the one or more third band filters of the ganged filters 534 (e.g., the filters support the same frequency band(s)). In some embodiments, the GNSS filter of the ganged filter 532 is associated with a frequency band(s) that is outside a frequency band associated with the one or more third band filters of the ganged filter 532 (and/or that is outside a frequency band(s) associated with the one or more third band filters of the ganged filter 534). Further, in some embodiments, the GNSS filter of the ganged filter 534 is associated with a frequency band(s) that is outside a frequency band associated with the one or more third band filters of the ganged filter 534 (and/or that is outside a frequency band(s) associated with the one or more third band filters of the ganged filter 532).

As noted above, the switches 536, 538, and/or 540 can be configured to route a signal through the combined-filter circuit 532 based on a control signal(s) from a controller (not illustrated). For example, if the switch 536 receives a control signal from a controller to route a signal to the ganged filters 532, the switch 536 can transition to a first state and route the signal to the ganged filters 532. Alternatively, if the switch 536 receives a control signal from a controller to route a signal to the ganged filters 534, the switch 536 can transition to a second state and route the signal to the ganged filters 534. Further, if the switch 538 receives a control signal from a controller to route a filtered signal from the GNSS filter of the ganged filter 532 (e.g., select the GNSS filter of the ganged filter 532 since the switch 536 also selected the ganged filter 532), the switch 538 can transition to a first state and route the filtered signal from the GNSS filter of the ganged filter 532 to the LNA 550. Alternatively, if the switch 538 receives a control signal from a controller to route a filtered signal from the GNSS filter of the ganged filter 534 (e.g., select the GNSS filter of the ganged filter 534 since the switch 536 also selected the ganged filter 534), the switch 538 can transition to a second state and route the filtered signal from the GNSS filter of the ganged filter 534 to the LNA 550. In a similar manner, if the switch 540 receives a control signal from a controller to route a filtered signal from the one or more third band filters of the ganged filter 532, the switch 540 can transition to a first state and route the filtered signal from the one or more third band filters of the ganged filter 532 to the LNA 552. Alternatively, if the switch 540 receives a control signal from a controller to route a filtered signal from the one or more third band filters of the ganged filter 534, the switch 540 can transition to a second state and route the filtered signal from the one or more third band filters of the ganged filter 534 to the LNA 552. Although the switches 538 and 540 are illustrated in the example of FIG. 5, in some instances one or more of the switches 538 and 540 can be eliminated. For example, an LNA can be implemented for each of the individual filters of the ganged filters 532 and the ganged filters 534.

In some embodiments, the ganged filters 532 and/or the ganged filters 534 are associated with a specific frequency range. For example, the ganged filters 532 and/or the ganged filters 534 can include band filters that are configured to support frequencies in mid-to-low-range bands (MLB) (e.g., a frequency range of about 960 MHz to 1710 MHz). However, the ganged filters 532 and/or the ganged filters 534 can support a variety of frequency ranges. In some embodiments, the GNSS filter of the ganged filters 532 and/or the GNSS filter of the ganged filters 534 are associated with a frequency range of 1,559-1607 MHz (e.g., the upper L bands). In some embodiments, the GNSS filter of the ganged filter 532 and/or the GNSS filter of the ganged filter 534 are associated with (e.g., configured to support) one or more of the bands described in Table 1 or described elsewhere within the disclosure. Further, in some embodiments, the one or more third band filters of the ganged filters 532 and/or the one or more third band filters of the ganged filters 534 are associated with (e.g., configured to support) one or more of the bands described in Table 2 or described elsewhere within the disclosure.

The LNA 550 and/or the LNA 552 can be configured to amplify a signal and provide an amplified signal to another component, such as a transceiver (not illustrated). In the example of FIG. 5, the LNA 550 is coupled to and configured to receive a signal from the switch 538, while the LNA 552 is coupled to and configured to receive a signal from the switch 540. However, the LNAs can be arranged in a variety of other configurations. Further, although two LNAs are illustrated, any number of LNAs can be implemented. For example, the system 500 can include an LNA for each of the four branches (e.g., the four filters).

Figure 6:
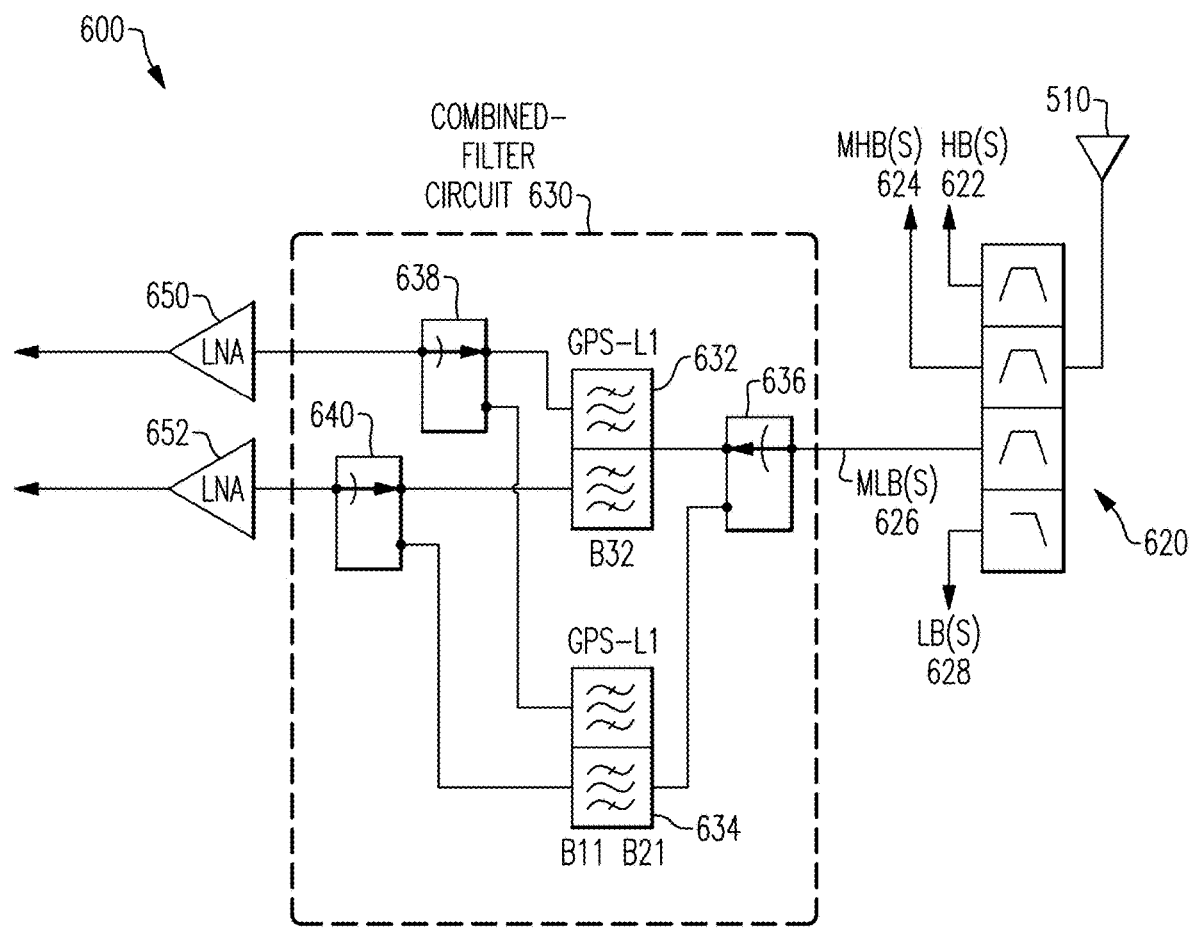
FIG. 6 illustrates an example system that includes a satellite-navigation-band filter and multiple mid-range band filters implemented in a ganged configuration in accordance with one or more embodiments.

FIG. 6 illustrates an example system 600 that includes a satellite-navigation-band filter and multiple mid-range band filters implemented in a ganged configuration in accordance with one or more embodiments. In some embodiments, the system 600 illustrates an example of the system 500 of FIG. 5 with the GNSS filter of the ganged filter 532 implemented as a global positioning system (GPS) L1 filter for a ganged filter 632, the one or more third band filters of the ganged filter 532 implemented as a B32 band filter for the ganged filter 632, the GNSS filter of the ganged filter 534 implemented as a GPS-L1 filter for ganged filters 634, the one or more third band filters of the ganged filter 534 implemented as B11 and B21 band filters for the ganged filters 634. However, the system 600 can be implemented in a variety of other contexts.

The system 300 includes an antenna 610 coupled to a multiplexer 620. The multiplexer 620 can be configured to sort a signal into a plurality of signals that are associated with a plurality of frequency ranges, respectively. For example, the multiplexer 620 can include: (i) a first filter (e.g., a band-pass or high-pass filter) that is configured to provide an output signal associated with one or more high-range bands (HB) 622; (ii) a second filter (e.g., a band-pass filter) that is configured to provide an output signal associated with the one or more mid-to-high-range bands (MHB) 624; (iii) a third filter (e.g., a band-pass filter) that is configured to provide an output signal associated with the one or more mid-to-low-range bands (MLB) 626; and/or (iv) a fourth filter (e.g., a low-pass filter) that is configured to provide an output signal associated with one or more low-range bands (LB) 628. Although four filters are illustrated in FIG. 6, the multiplexer 620 can include any number of filters.

The system 600 also includes a combined-filter circuit 630 coupled to the multiplexer 620. In this example, the combined-filter circuit 630 includes a switch 636 coupled to the multiplexer 620, the ganged filters 632 coupled to the switch 636, the ganged filters 634 coupled to the switch 636, a switch 638 coupled to the ganged filters 632 (e.g., the GPS-L1 filter), the ganged filters 634 (e.g., the GPS-L1 filter), and a low noise amplifier (LNA) 650, and a switch 640 coupled to the ganged filters 632 (e.g., the B32 filter), the ganged filters 634 (e.g., the B11 and B21 filters), and an LNA 652. The combined-filter circuit 632 can be configured to receive a signal associated with the one or more MLBs 626 from the multiplexer 620. The switch 636 can be controlled to route the signal to the ganged filters 632 and/or the ganged filters 634. The switch 638 can be controlled to route a signal from either the ganged filters 632 or the ganged filters 634 to an LNA 650. Further, the switch 640 can be controlled to route a signal from either the ganged filters 632 or the ganged filters 634 to the LNA 652.

As shown, the ganged filters 632 include a GPS-L1 filter and B32 band filters combined in a ganged configuration. Further, the ganged filters 634 include a GPS-L1 filter and B11 and B21 band filters in a ganged configuration. In this example, the GPS-L1 filter of the ganged filters 632 and/or the GPS-L1 filter of the ganged filters 634 are each configured to support the GPS-L1 band. Further, the B32 band filter of the ganged filters 632 is configured to support the B32 band. Moreover, the B11 and B21 band filters of the ganged filters 634 are configured to support the B11 and B21 bands. In some embodiments, the B11 and B21 band filters of the ganged filter 634 can be implemented as a combined filter (e.g., in a ganged configuration), since the B11 and B21 bands do not overlap.

Figure 7:
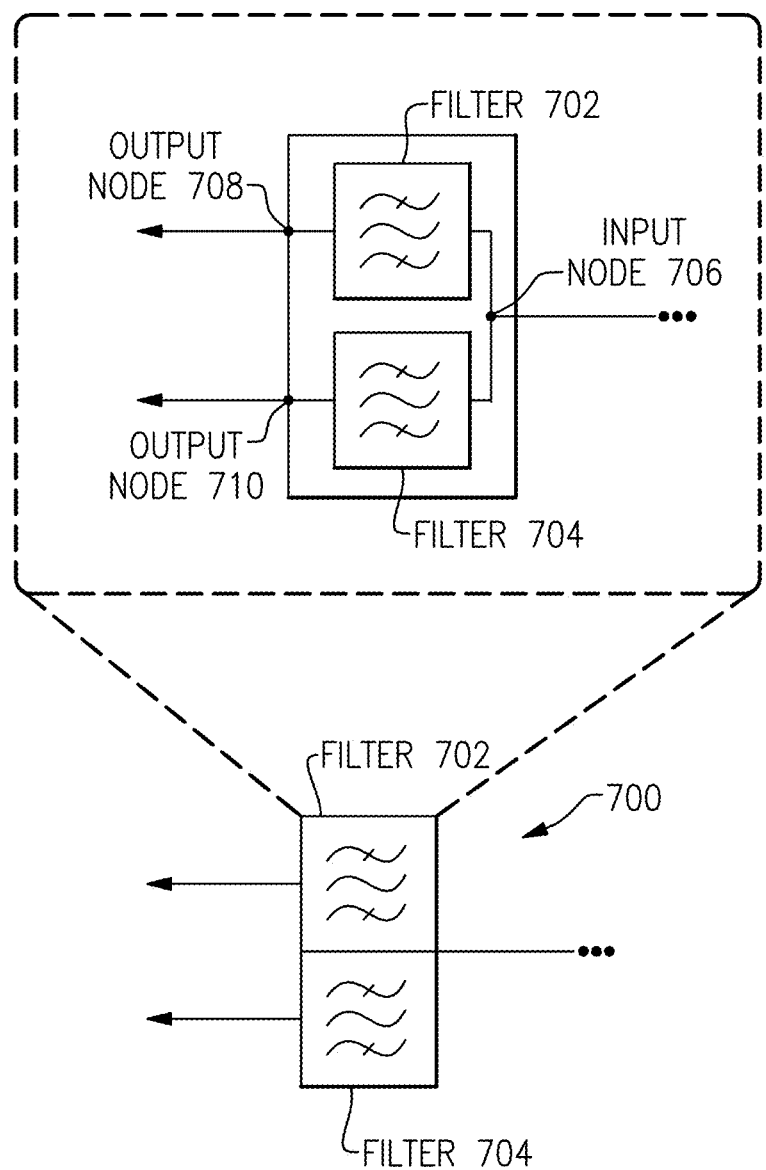
FIG. 7 illustrates example ganged filters in accordance with one or more embodiments.

FIG. 7 illustrates example ganged filters 700 in accordance with one or more embodiments. As illustrated, the ganged filters 700 includes a filter 702 combined with a filter 704 and configured to be associated with a same input node 706. That is, the filter 702 and the filter 704 are each coupled to the input node 706, which forms a common node. In such configuration, a signal that is provided to the input node 706 can be provided to the filter 702 and the filter 704. As also illustrated, the filter 702 is coupled to an output node 708 and configured to provide an output signal to the output node 708. Meanwhile, the filter 704 is coupled to the output node 710 and configured to provide an output signal to the output node 710. In some embodiments, a ganged configuration of filters can refer to the filters being permanently combined. Further, in some embodiments, a set of ganged filters can be referred to as a filter array.

Figure 8:
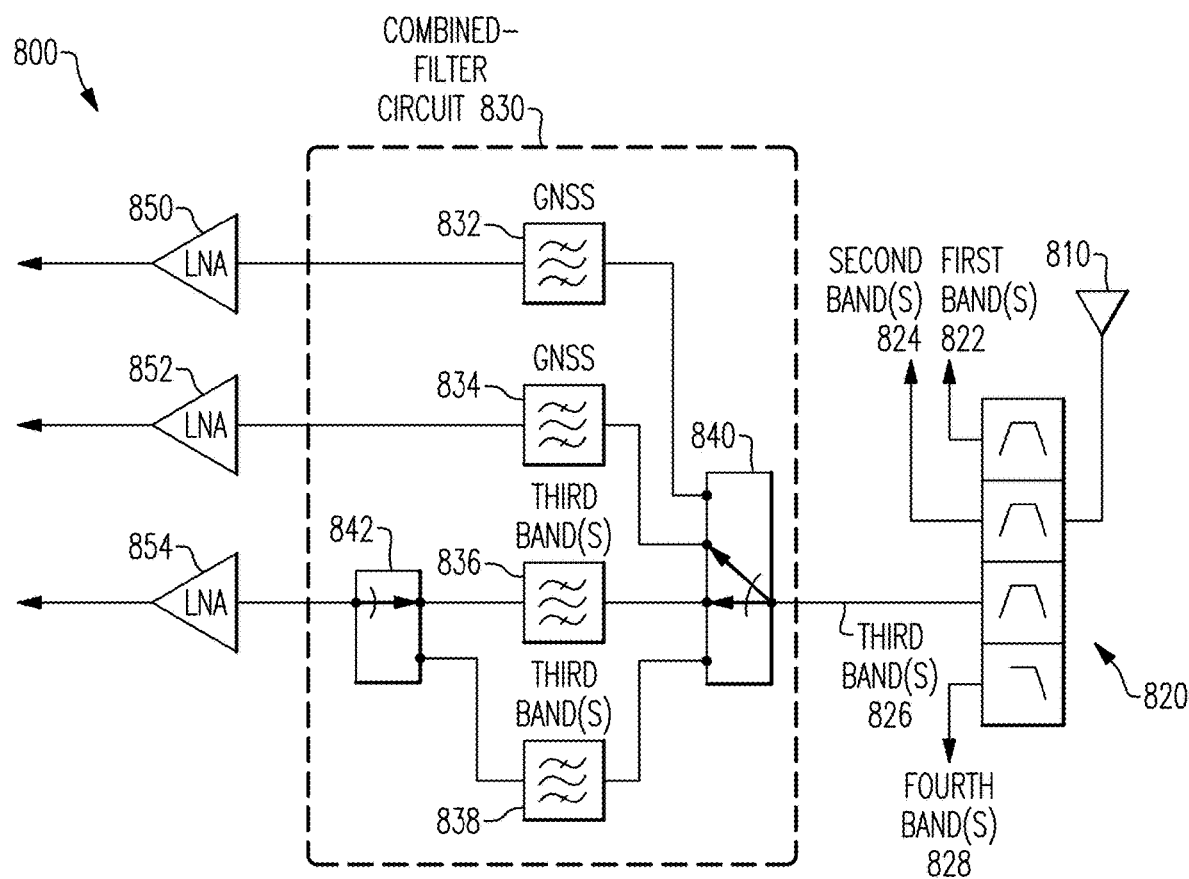
FIG. 8 illustrates an example system with multiple satellite-based navigation bands in accordance with one or more embodiments.

FIG. 8 illustrates an example system 800 with multiple satellite-based navigation bands in accordance with one or more embodiments. The system 300 includes an antenna 810 coupled to a multiplexer 820. The multiplexer 820 can be configured to sort a signal into a plurality of signals that are associated with a plurality of frequency ranges, respectively. For example, the multiplexer 820 can include: (i) a first filter that is configured to provide an output signal associated with one or more first frequency bands 822; (ii) a second filter that is configured to provide an output signal associated with one or more second frequency bands 824; (iii) a third filter that is configured to provide an output signal associated with one or more third frequency bands 826; and/or (iv) a fourth filter that is configured to provide an output signal associated with one or more fourth frequency bands 828.

The system 800 also includes a combined-filter circuit 830 coupled to the multiplexer 820. In this example, the combined-filter circuit 830 includes a switch 840 coupled to the multiplexer 820, a Global Navigation Satellite System (GNSS) filter 832 coupled to the switch 840 and a low noise amplifier (LNA) 850, a GNSS filter 834 coupled to the switch 840 and the LNA 852, one or more third band filters 836 coupled to the switch 840 and a switch 842, one or more third band filters 838 coupled to the switch 840 and the switch 842, and the switch 842 coupled to the one or more third band filters 838, the one or more third band filters 836, and an LNA 854. In the example of FIG. 8, the switch 840 is implemented as a multi-arm-controlled switch with two or more arms that are configured to be simultaneously controlled, such as based on a control signal from a controller (not illustrated). Although illustrated in a switch-combined configuration, in some embodiments the GNSS filter 832 and the GNSS filter 834 can be implemented in a ganged configuration, such as with the GNSS filter 832 ganged with the one or more third filters 836 and/or the GNSS filter 834 ganged with the one or more third band filters 838.

The switch 840 can be controlled to route a signal to the GNSS filter 832, the GNSS filter 834, the one or more third band filters 836, the one or more third band filters 838, or any combination thereof. In some embodiments, the GNSS filter 832 is associated with a different frequency band(s) than the GNSS filter 834. For example, the GNSS filter 832 can be configured to support the GPS-L1 band, while the GNSS filter 834 can be configured to support the GPS-L5 band. Alternatively, in some embodiments, the GNSS filter 832 is associated with the same frequency band(s) as the GNSS filter 834. In some embodiments, the switch 840 can route a signal to both the GNSS filter 832 and the GNSS filter 834. However, the switch 840 can route a signal to any combination of the filters 832, 834, 836, and/or 838.

The switch 842 can be controlled to route a signal from the one or more third band filters 836 to the LNA 854 or to route a signal from the one or more third band filters 838 to the LNA 854. In some embodiments, the one or more third band filters 836 are associated with a different frequency band(s) than the one or more third band filters 838. For example, the one or more third band filters 836 can be configured to support the B32 band, while the one or more third band filters 838 can be configured to support the B11 and/or B21 bands. Alternatively, in some embodiments, the one or more third band filters 836 are associated with the same frequency band(s) as the one or more third band filters 838. In some embodiments, the switch 840 can route a signal from both the one or more third band filters 836 and the one or more third band filters 838.

Figure 9:
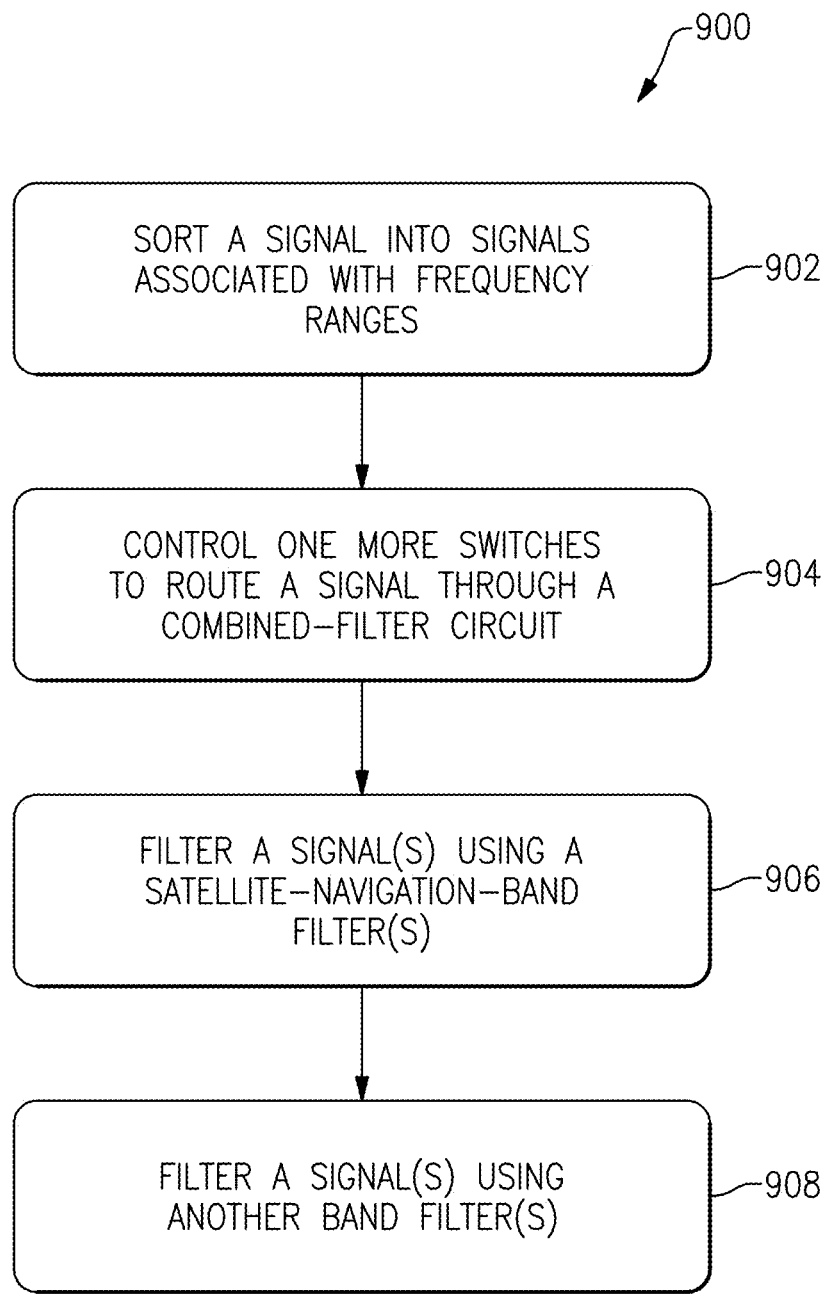
FIG. 9 illustrates an example flow diagram of a process to filter a signal(s) with one or more satellite-navigation-band filters and/or one or more other filters in accordance with one or more embodiments.

FIG. 9 illustrates an example flow diagram of a process 900 to filter a signal(s) with one or more satellite-navigation-band filters and/or one or more other filters in accordance with one or more embodiments. The process 900 can be implemented by any of the components discussed herein, such as a controller, an RF module, or any component of a radio-frequency device.

At 902, a signal can be sorted into multiple signals associated with multiple frequency ranges, respectively. For example, a multiplexer can receive a signal from an antenna and sort the signal into multiple signals associated with different frequency ranges, such as a signal associated with a high-frequency band(s), a signal associated with a mid-frequency band(s), a signal associated with a low-frequency band(s), and so on. The multiplexer can provide any number of signals as an output signal(s).

At 904, one or more switches can be controlled to route a signal through a combined-filter circuit. For example, a controller can send one or more control signals to one or more switches of a combined-filter circuit to route a signal received from a multiplexer to one or more filters of the combined-filter circuit. The combined-filter circuit can include one or more satellite-navigation-band filters and/or one or more other band filters arranged in a switch-combined configuration and/or a ganged configuration.

At 906, one or more signals can be filtered using one or more satellite-navigation-band filters. For example, one or more satellite-navigation-band filters of a combined-filter circuit can filter a signal received from a multiplexer/switch and provide a filtered signal that is associated with a satellite-navigation band as an output signal. In some embodiments, the filtered signal is provided to a low noise amplifier (LNA).

At 906, one or more signals can be filtered using one or more other band filters. For example, one or more mid-to-low-range filters of a combined-filter circuit can filter a signal received from a multiplexer/switch and provide a filtered signal that is associated with a mid-to-low-range filter as an output signal. In some embodiments, the filtered signal is provided to a low noise amplifier (LNA).

Figure 10:
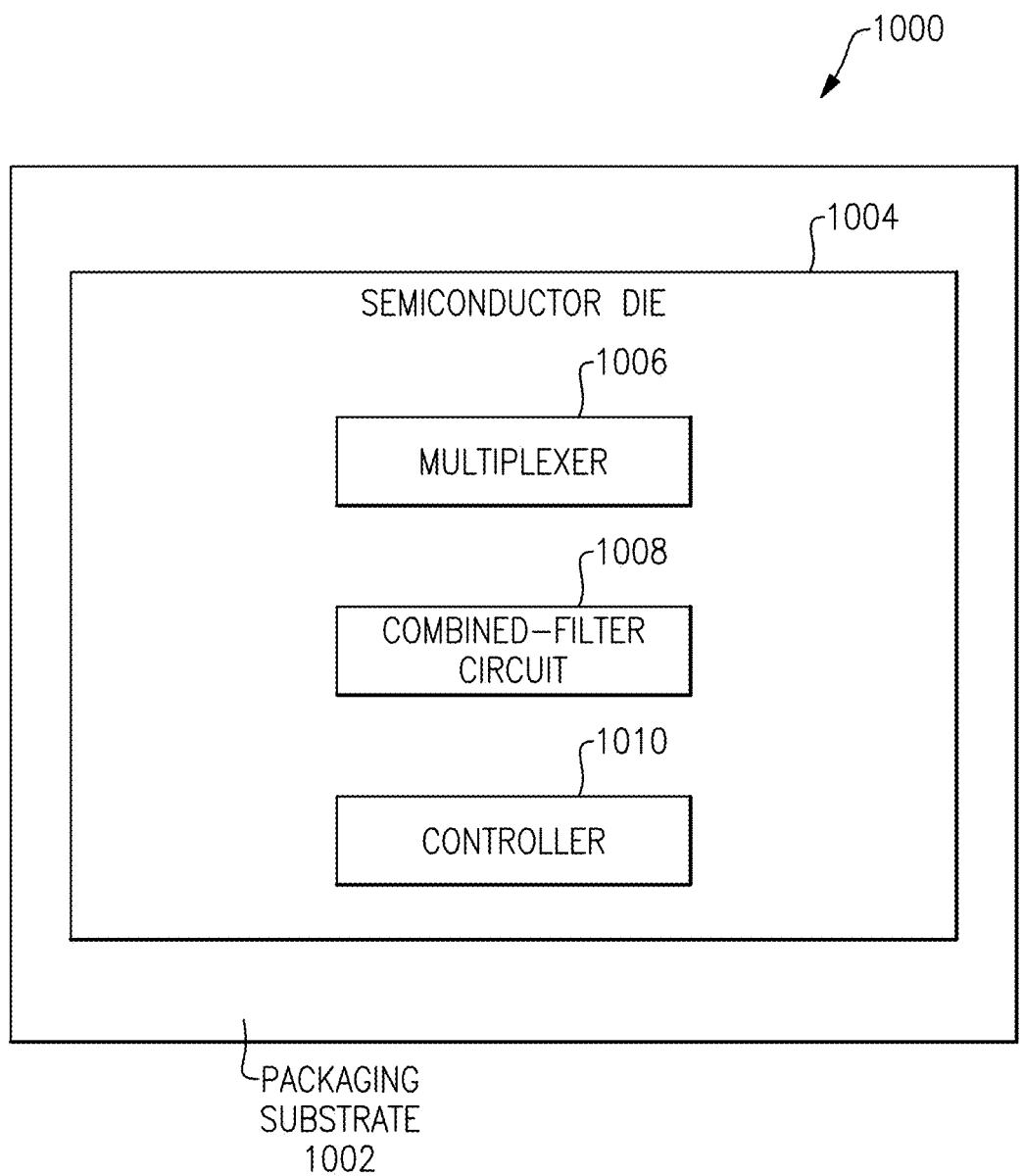
FIG. 10 illustrates an example radio-frequency module in accordance with one or more embodiments.

FIG. 10 illustrates an example radio-frequency module 1000 in accordance with one or more embodiments. The radio-frequency module 1000 includes a packaging substrate 1002, a semiconductor die 1004 mounted on the packaging substrate 1002, a multiplexer 1006 implemented on the semiconductor die 1004, a combined-filter circuit 1008 implemented on the semiconductor die 1004, and a controller 1010 implemented on the semiconductor die 1004. The multiplexer 1006 can include any of the multiplexers discussed herein, the combined-filter circuit 1008 can include any of the combined-filter circuits discussed herein, and/or the controller 1010 can include any of the controllers discussed herein. Although the controller 1010 is illustrated as being implemented on the semiconductor die 1004 and the packaging substrate 1002, the controller 1010 can be implemented on a separate semiconductor die and/or packaging substrate. Similarly, the multiplexer 1006 and the combined-filter circuit 1008 can be implemented on separate semiconductor dies and/or packaging substrates. In some embodiments, the radio-frequency module 1100 can be a front-end module (FEM), which can include a diversity module (e.g., a diversity-receive module) in some examples.

Figure 11:
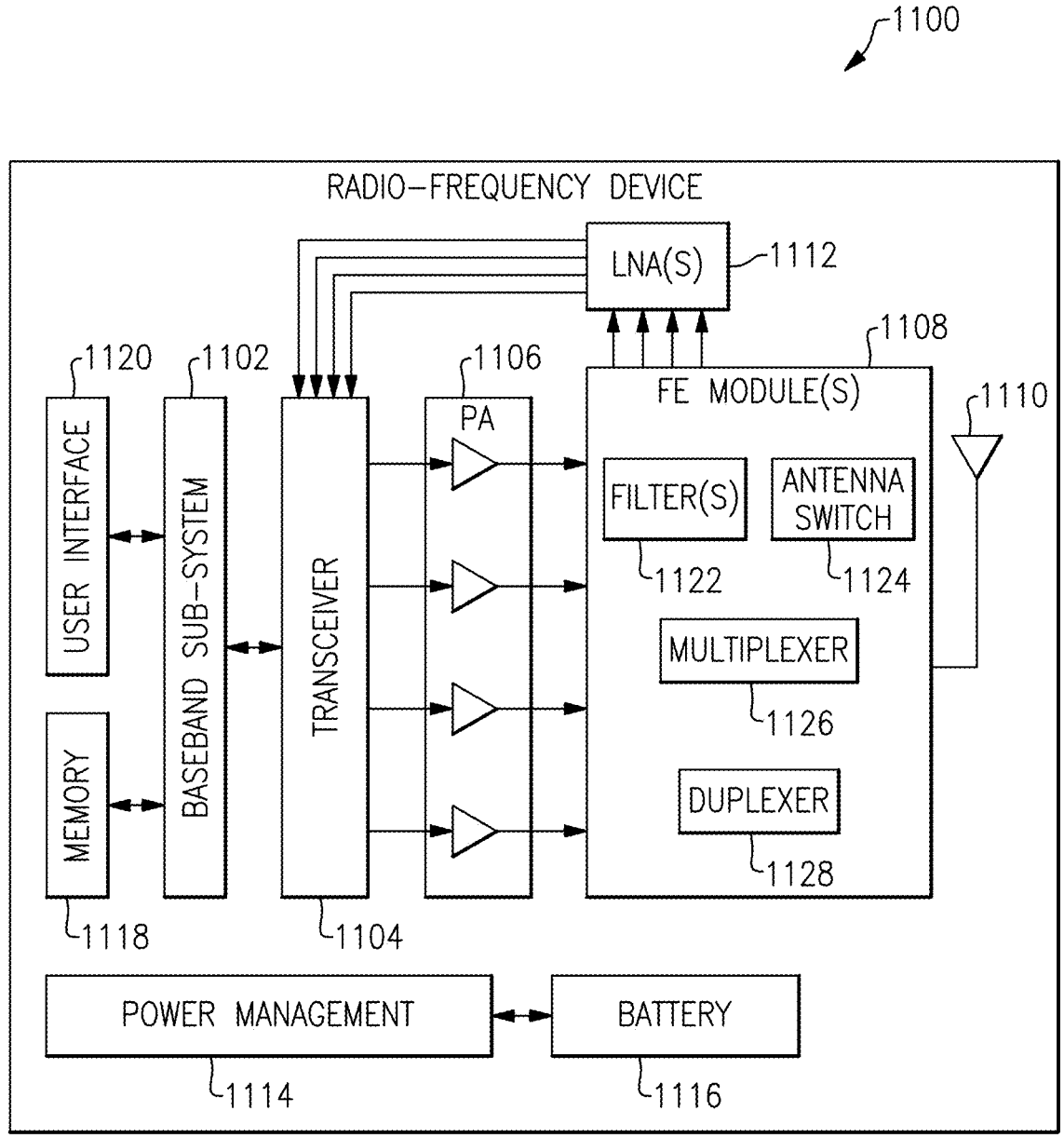
FIG. 11 illustrates an example radio-frequency device in accordance with one or more embodiments.

FIG. 11 illustrates an example radio-frequency device 1100 in accordance with one or more embodiments. As shown, the radio-frequency device 1100 can include a baseband sub-system 1102, a transceiver 1104, a power amplifier (PA) module 1106, one or more front-end (FE) modules 1108, one or more antennas 1110, one or more low noise amplifiers (LNAs) 1112, a power management system 1114, a battery 1116, a memory 1118, and a user interface 1120. The baseband sub-system 1102, the transceiver 1104, the PA module 1106, the one or more FE modules 1108, the one or more antennas 1110, the one or more LNAs 1112, the power management system 1114, the battery 1116, the memory 1118, and/or the user interface 1120 can be in communication with each other.

The baseband sub-system 1102 can be connected to the user interface 1120 to facilitate various input and/or output of voice and/or data provided to and/or received from a user. The baseband sub-system 1102 can also be connected to the memory 1118 that is configured to store data and/or instructions to facilitate operation of the radio-frequency device 1100 and/or to provide storage of information for a user.

The transceiver 1104 can generate radio-frequency (RF) signals for transmission and/or process incoming RF signals received from the one or more LNAs 1112, the one or more antennas 1110, and/or the one or more FE modules 1108. The transceiver 1104 can interact with the baseband sub-system 1102 that is configured to provide conversion between data and/or voice signals suitable for a user and/or RF signals suitable for the transceiver 1104. The transceiver 1104 can also be connected to the power management system 1114.

The PA module 1106 can include a plurality of PAs that can provide an amplified RF signal to the one or more antennas 1110, such as via one or more components of the one or more FE modules 1108. Although four paths are shown as inputs and outputs to the PA module 1106, and any number of input and/output paths can be implemented.

The one or more FE modules 1108 can include one or more filters 1122, an antenna switch 1124, a multiplexer 1126, and/or a duplexer 1128. The one or more filters 1122 can include receive (Rx) filters and/or transmit (Tx) filters. In some embodiments, one or more of the one or more filters 1122 are implemented as part of a combined-filter circuit, such as any of the combined-filter circuits discussed herein, which can include one or more switches for routing signals in some examples. The antenna switch 1124 can route a signal to and/or from the one or more antennas 1110, such as to and/or from other components of the one or more FE modules 1108. The antenna switch 1124 can include any number of poles and/or throws. In some embodiments, the antenna switch 1124 is implemented as part of a module. The multiplexer 1126 can be configured to implement multiplexing. The duplexer 1128 can allow transmit and/or receive operations to be performed simultaneously using a common antenna. In some embodiments, the one or more FE modules 1108 can route one or more received signals to the one or more LNAs 1112, which can be configured to amplify the one or more received signals. In some embodiments, the packaged module 1108 is implemented as a front-end module. Although the one or more LNAs 1112 and the PA module 1106 are illustrated as separate components from the one or more FE modules 1108, in some embodiments the one or more LNAs 1112 and/or the PA module 1106 are part of the one or more FE modules 1108.

The one or more antennas 1110 can include antennas for transmitting and/or receiving signals associated with a wide variety of frequencies and communications standards. In examples, the one or more antennas 1110 support Multiple-Input Multiple-output (MIMO) communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity can refer to communications in which a particular antenna is selected for operation at a particular time. For example, a switch can be used to select a particular antenna from a group of antennas based on a variety of factors, such as an observed bit error rate and/or a signal strength indicator. In examples, the one or more antennas 1110 can include a diversity antenna.

The power management system 1114 can be configured to manage power for operation of the radio-frequency device 1100. The power management system 1114 can provide power to any number of components of the radio-frequency device 1100. The power management system 1114 can receive a battery voltage from the battery 1116. The battery 1116 can be any suitable battery for use in the radio-frequency device 1100, including, for example, a lithium-ion battery.

The radio-frequency device 1100 can communicate using a wide variety of communications technologies, including, but not limited to, 2G, 3G, 4G (including Long Term Evolution (LTE), LTE-Advanced, and LTE-Advanced Pro), 5G, Wireless Local Area Network (WLAN) (for instance, Wi-Fi), Wireless Personal Area Network (WPAN) (for instance, Bluetooth and ZigBee), Wireless Metropolitan Area Network (WMAN) (for instance, WiMax), and/or satellite-based radio navigation systems (for instance, Global Positioning System (GPS) technologies).

The radio-frequency device 1100 can operate with beam-forming in certain implementations. For example, the radio-frequency device 1100 can include phase shifters having variable phase controlled by the transceiver 1104. Additionally, the phase shifters can be controlled to provide beam formation and directivity for transmission and/or reception of signals using the one or more antennas 1110. For example, in the context of signal transmission, the phases of the transmit signals provided to the one or more antennas 1110 are controlled such that radiated signals from the one or more antennas 1110 combine using constructive and destructive interference to generate an aggregate transmit signal exhibiting beam-like qualities with more signal strength propagating in a given direction. In the context of signal reception, the phases are controlled such that more signal energy is received when the signal is arriving to the one or more antennas 1110 from a particular direction. In some embodiments, the one or more antennas 1110 include one or more arrays of antenna elements to enhance beamforming.

In some embodiments, the radio-frequency device 1100 supports carrier aggregation, thereby providing flexibility to increase peak data rates. Carrier aggregation can be used for both Frequency Division Duplexing (FDD) and Time Division Duplexing (TDD) and can be used to aggregate a plurality of carriers or channels. Carrier aggregation includes contiguous aggregation, in which contiguous carriers within the same operating frequency band are aggregated. Carrier aggregation can also be non-contiguous and can include carriers separated in frequency within a common band or in different bands.

The radio-frequency device 1100 can include a wide variety of devices that are configured to communicate wirelessly. For example, the radio-frequency device 1100 can include a cellular phone, a smart-phone, a hand-held wireless device with or without phone functionality, a wireless tablet, a smart appliance, a smart vehicle, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wearable device (e.g., a watch), a clock, etc.

The detailed description is set forth with reference to the accompanying figures. In the figures, the left-most digit(s) of a reference number identifies the figure in which the reference number first appears. The use of the same reference numbers in different figures indicates similar or identical items.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled" can refer to two or more elements that may be either directly connected or connected by way of one or more intermediate elements. Components discussed herein can be coupled in a variety of manners, such as through a conductive material. Additionally, the words "herein," "above," "below," and words of similar import, when used in this disclosure, shall refer to this application as a whole and not to any particular portions of this application. Where the context permits, words in the above Description using the singular or plural number may also include the plural or singular number respectively.

The above description of embodiments of the disclosure is not intended to be exhaustive or to limit the disclosure to the precise form disclosed above. While specific embodiments, and examples, are described above for illustrative purposes, various equivalent modifications are possible within the scope of the disclosure, as those skilled in the relevant art will recognize. For example, while processes or blocks can be presented in a given order, alternative embodiments can perform routines having steps, or employ systems having blocks, in a different order, and some processes or blocks can be deleted, moved, added, subdivided, combined, and/or modified. Each of these processes or blocks can be implemented in a variety of different ways. Also, while processes or blocks are at times shown as being performed in series, these processes or blocks can instead be performed in parallel or can be performed at different times.

The features described herein can be applied to other systems, not necessarily the system described above. The elements and acts of the various embodiments described above can be combined to provide further embodiments.

In some embodiments, the methods and/or systems discussed herein can be implemented at least in part by control circuitry and/or memory. For example, memory can store executable instructions that, when executed by control circuitry, cause the control circuitry to perform operations discussed herein. To illustrate, in some embodiments of the process of FIG. 9, a device can include memory and control circuitry, wherein the memory can store executable instructions that, when executed by the control circuitry, cause the control circuitry to perform, at least in part, any of the operations of the process of FIG. 9. Additionally, or alternatively, other methods and/or systems discussed herein can be implemented at least in part with control circuitry and memory storing executable instructions.

Control circuitry can include one or more processors, such as one or more central processing units (CPUs), one or more microprocessors, one or more graphics processing units (GPUs), one or more digital signal processors (DSPs), and/or other processing circuitry. Alternatively, or additionally, control circuitry can include one or more application specific integrated circuits (ASIC), one or more field-programmable gate arrays (FPGAs), one or more program-specific standard products (ASSPs), one or more complex programmable logic devices (CPLDs), and/or the like. Control circuitry can be configured to execute one or more instructions stored in memory to thereby perform one or more operations to implement various functionality discussed herein.

Memory can include any suitable or desirable type of computer-readable media. For example, computer-readable media can include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other types of data. Computer-readable media that may be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As used in certain contexts herein, computer-readable media may not generally include communication media, such as modulated data signals and carrier waves. As such, computer-readable media should generally be understood to refer to non-transitory media.

While some embodiments have been described, these embodiments have been presented by way of example only, and are not intended to limit the scope of the disclosure. Indeed, the methods and systems described herein can be embodied in a variety of other forms; furthermore, various omissions, substitutions and changes in the form of the methods and systems described herein can be made without departing from the spirit of the disclosure. Claims and their equivalents are intended to cover such forms or modifications as would fall within the scope and spirit of the disclosure.

What is claimed is:

1. A system comprising:
   a multiplexer configured to receive an input signal from an antenna and provide an output signal; and
   a combined-filter circuit coupled to the multiplexer and configured to receive the output signal from the multiplexer, the combined-filter circuit including a first mid-range-band filter, a second mid-range-band filter, a satellite-navigation-band filter, and a switch coupled to the multiplexer, the switch including two or more arms that are configured to be controlled simultaneously to implement a switch-combined configuration, the switch being configured to simultaneously route the output signal to the satellite-navigation-band filter and at least one of the first mid-range-band filter or the second mid-range-band filter.

2. The system of claim 1 wherein the first mid-range-band filter is configured to support at least one of a cellular band B11, a cellular band B21, or a cellular band B32.

3. The system of claim 1 wherein the first mid-range-band filter is configured to support a cellular band B32 for receive operations and the second mid-range-band filter configured to support at least one of a cellular band B11 for receive operations or a cellular band B21 for receive operations.

4. The system of claim 1 wherein the satellite-navigation-band filter is configured to support a Global Navigation Satellite System (GNSS) cellular band.

5. The system of claim 4 wherein the GNSS cellular band includes at least one of a GPS-L1 cellular band, a GPS-L2 cellular band, or a GPS-L5 cellular band.

6. The system of claim 1 wherein the first mid-range-band filter is implemented in a ganged configuration with the second mid-range-band filter.

7. The system of claim 1 wherein the first mid-range-band filter is configured to support a band within a frequency range of 960 MHz to 1710 MHz.

8. A filter system comprising:
a first switch configured to receive a signal from a multiplexer;
a first filter coupled to the first switch and associated with a satellite-navigation band within a frequency range;
a second filter coupled to the first switch and associated with a first band within the frequency range, the first filter and the second filter being coupled to the first switch via a first common input node;
a third filter coupled to the first switch and associated with a second band within the frequency range; and
a fourth filter coupled to the first switch and combined with the third filter, the fourth filter being associated with the satellite-navigation band, the third filter and the fourth filter being coupled to the first switch via a second common input node.

9. The filter system of claim 8 wherein the first switch includes two or more arms that are configured to be controlled simultaneously.

10. The filter system of claim 8 wherein the first switch is configured to, in a first state, route the signal to the first filter and the second filter and configured to, in a second state, route the signal to the third filter and the fourth filter.

11. The filter system of claim 8 further comprising a second switch coupled to the second filter, the third filter, and a low noise amplifier, the second switch being configured to select a filtered signal from the second filter or the third filter.

12. The filter system of claim 8 wherein the frequency range is about 960 MHz to 1710 MHz.

13. The filter system of claim 12 wherein the satellite-navigation band is associated with a frequency range that is outside a frequency range associated with the first band and outside a frequency range associated with the second band.

14. The filter system of claim 8 wherein satellite-navigation band is a Global Navigation Satellite System (GNSS) cellular band.

15. The filter system of claim 8 wherein the second filter is configured to support at least one of a cellular band B11, a cellular band B21, or a cellular band B32.

16. The filter system of claim 14 wherein the GNSS cellular band includes at least one of a GPS-L1 cellular band, a GPS-L2 cellular band, or a GPS-L5 cellular band.

17. A radio-frequency module comprising:
a packaging substrate;
a multiplexer implemented on the packaging substrate and coupled to at least one of a primary antenna or a diversity antenna; and
a filter system implemented on the packaging substrate and coupled to the multiplexer, the filter system including a first mid-range-band filter, a second mid-range-band filter, a satellite-navigation-band filter, and a switch coupled to the multiplexer, the switch including two or more arms that are configured to be controlled simultaneously to implement a switch-combined configuration, the switch being configured to simultaneously route a signal to the satellite-navigation-band filter and at least one of the first mid-range-band filter or the second mid-range-band filter.

18. The radio-frequency module of claim 17 wherein the first mid-range-band filter and the satellite-navigation-band filter are coupled to the switch via a common input node.

19. The radio-frequency module of claim 17 wherein the first mid-range-band filter is configured to support a band within a frequency range of 960 MHz to 1710 MHz.

20. The radio-frequency module of claim 17 wherein the satellite-navigation-band filter is configured to support at least one of a GPS-L1 cellular band, a GPS-L2 cellular band, or a GPS-L5 cellular band.

* * * * *